United States Patent [19]

Ozcelik et al.

[11] Patent Number: 5,574,663
[45] Date of Patent: Nov. 12, 1996

[54] METHOD AND APPARATUS FOR REGENERATING A DENSE MOTION VECTOR FIELD

[75] Inventors: Taner Ozcelik, San Jose, Calif.; James C. Brailean, Park Ridge; Aggelos K. Katsaggelos, Chicago, both of Ill.

[73] Assignee: Motorola, Inc.

[21] Appl. No.: 505,981

[22] Filed: Jul. 24, 1995

[51] Int. Cl.$^6$ ............................................. G06F 17/00
[52] U.S. Cl. ............................................. 364/514 R
[58] Field of Search ............................ 364/514 R, 514 A, 364/514 C, 715.02; 348/404, 407, 412, 413, 415

[56] References Cited

U.S. PATENT DOCUMENTS 5,500,685   3/1996   Kokarm ............................... 348/407

OTHER PUBLICATIONS

Ozcelik et al. ; "Image And Video Compression Algorithms Based On Recovery Techniques Using Mean Field Annealing"; IEEE 1995.

Brailgan et al ; "Restoration of Low Bit Rate Compressed Images Using Mean Field Annealing" IEEE 1994.

"Image Sequence Compression Using a Pel–Recursive Motion–Compensated Technique" Robert J. Moorhead II, Sarah a. Rajala, and Lawrence W. Cook, IEEE Journal on Selected Areas in Communications, vol.. SAC–5, No. 7, Aug. 1987, pp. 1100–1114.

"The Efficiency of Motion–Compensating Prediction for Hybrid Coding of Video Sequences" Bernd Girod, IEEE Journal on Selected Areas in Communications, vol. SAC–5, No. 7, Aug. 1987 pp. 1140–1154.

"Improvements of Transform Coding Algorithm for Motion–Compensated Interframe Prediction Errors—DCT/SQ Coding" Masahide Kaneko, Yosinori Hatori and Atsushi Koike, IEEE Journal on Selected Areas in Communications, vol. SAC–5, No. 7 Aug. 1987.

"Gradient–Based Algorithms for Block–Oriented MAP Estimation of Motion and Appplication to Motion–Compensated Temporatl Interpolation" Claude Bergeron and Eric Dubois, IEEE Transactions on Circuits and Systems for Video Technology, vol. 1, No. 1, Mar., '91 pp. 72–85.

"Use of Colour Information in Bayesian Estimation of 2–D Motion" Janusz Konrad and Eric Dubois, INRS–Telecommunications,, M17.23, pp. 2205–2208 (1990).

"Motion–Compensated Filtering of Time–Varying Images" Eric Dubois, INRS–Telecommunications, May, 1991, pp. 103–131.

"Comparison of Stochastic and Deterministic Solution Methods in Bayesian Estimation of 2D Motion", Janusz Konrad and Eric Dubois, INRS–Telecommunications, vol. 9, No. 4, Aug., 1991, pp. 215–228.

"Low Bit Rate Video Coding Using Robust Motion Vector Regeneration in the Decoder" Mark R. Banham, James C. Brailean, Cheuk L. Chan, Aggelos K. Katsaggelos, IEEE Transactions on Image Processing, vol. 3, No. 5, Sep. 1994, pp. 652–665.

(List continued on next page.)

Primary Examiner—Ellis B. Ramirez
Attorney, Agent, or Firm—Darleen J. Stockley

[57] ABSTRACT

The present invention provides a method (300) and apparatus (100) for regenerating a dense motion vector field, which describes the motion between two temporally adjacent frames of a video sequence, utilizing a previous dense motion vector field. In this method, a spatial DVF and a temporal DVF are determined (302 and 304) and summed to provide a DVF prediction (306). This method and apparatus enables a dense motion vector field to be used in the encoding and decoding process of a video sequence. This is very important since a dense motion vector field provides a much higher quality prediction of the current frame as compared to the standard block matching motion estimation techniques. The problem to date with utilizing a dense motion vector field is that the information contained in a dense motion field is too large to transmit. The present invention eliminates the need to transmit any motion information.

26 Claims, 2 Drawing Sheets

OTHER PUBLICATIONS

"An Asaptive Regularized Recursive Displacement Estimation Algorithm", Serafim N. Efstratiadis, Aggelos K. Katsaggelos, IEEE Transactions on Image Processing, vol. 2, No. 3, Jul., 1993, pp. 341–352.

"Image Segmentation Based on Object Oriented Mapping Parameter Extimation" Michael Hotter and Robert Thoma, Signal Processing 15 (1988) pp. 315–344.

":Object–Oriented Motion Estimation and Segmentation in Image Sequences" Norbert Diehl, Signal Processing: Image Communications 3 (1990) pp. 23–56.

"Object–Oriented Analysis–Synthesis coding of Moving Images" Hans Georg Musmann, Michael Hotter and Jorn Ostermann, Signal Processing, Image Communications (1980) 117–135.

METHOD AND APPARATUS FOR REGENERATING A DENSE MOTION VECTOR FIELD

FIELD OF THE INVENTION

The present invention relates generally to video coding, and more particularly to using a dense motion vector field in video coding.

BACKGROUND OF THE INVENTION

Compression of digital video to a very low bit rate, VLBR, is a very important problem in the field of communications. In general, a VLBR is considered not to exceed 64 kilo-bits per second (Kbps) and is associated with existing personal communication apparatus, such as the public switch telephone network and cellular apparatus. To provide services like video on demand and video conferencing on these apparatus, would require the information contained in a digital video sequence to be compressed by a factor of 300 to 1. To achieve such large compression ratios, requires that all redundancy present in a video sequence be removed.

Current standards, such as H.261, MPEG1, and MPEG2 provide compression of a digital video sequence by utilizing a block motion-compensated Discrete Cosine Transform, DCT, approach. This video encoding technique removes the redundancy present in a video sequence by utilizing a two-step process. In the first step, a block-matching, BM, motion estimation and compensation algorithm estimates the motion that occurs between two temporally adjacent frames. The frames are then compensated for the estimated motion and compared to form a difference image. By taking the difference between the two temporally adjacent frames, all existing temporal redundancy is removed. The only information that remains is new information that could not be compensated for in the motion estimation and compensation algorithm.

In the second step, this new information is transformed into the frequency domain using the DCT. The DCT has the property of compacting the energy of this new information into a few low frequency components. Further compression of the video sequence is obtained by limiting the amount of high frequency information encoded.

The majority of the compression provided by this approach to video encoding is obtained by the motion estimation and compensation algorithm. That is, it is much more efficient to transmit information regarding the motion that exists in a video sequence, as opposed to information about the intensity and color. The motion information is represented using vectors which point from a particular location in the current intensity frame to where that same location originated in the previous intensity frame. For BM, the locations are predetermined non-overlapping blocks of equal size. All pixels contained in these blocks are assumed to have the same motion. The motion vector associated with a particular block in the present frame of a video sequence is found by searching over a predetermined search area, in the previous temporally adjacent frame for a best match. This best match is generally determined using the mean-squared-error (MSE) or mean-absolute-difference (MAD) between the two blocks. The motion vector points from the center of the block in the current frame to the center of the block which provides the best match in the previous frame.

Utilizing the estimated motion vectors, a copy of the previous frame is altered by each vector to produce a prediction of the current frame. This operation is referred to as motion compensation. As described above, the predicted frame is subtracted from the current frame to produce a difference frame which is transformed into the spatial frequency domain by the DCT. These spatial frequency coefficients are quantized and entropy encoded, providing further compression of the original video sequence. Both the motion vectors and the DCT coefficients are transmitted to the decoder, where the inverse operations are performed to produce the decoded video sequence.

It is well known in video compression that a dense motion vector field provides a much higher quality prediction of the current frame. However, since each pixel element, pixel, in a dense motion vector field has a motion vector associated with it, such a representation of the motion in the video sequence is prohibitively large to transmit. Therefore, video encoders are forced to utilize a BM approach to motion estimation and compensation. A method and apparatus that would allow a dense motion vector field to be used within the video encoder would be extremely beneficial and enabling.

DETAILED DESCRIPTION OF PREFERRED EMBODIMENTS

The method and apparatus described below enables a dense motion vector field to be utilized in the encoding process of a video sequence. Specifically, a method and apparatus are described where the dense motion vector field, used in the encoding and decoding process, is predicted from a previous dense motion vector field. Utilizing this predicted dense motion field eliminates the need to transmit any motion information. Therefore, the problem of transmitting a dense motion vector field is completely alleviated by the method and apparatus described below.

In order to describe the method and apparatus certain assumptions are made concerning the input video sequence. Specifically, the video source is assumed to be in a digital format where the number of pixels per row, the number of rows per frame, and the number of frames per second are known prior to the encoding process. Each pixel represents both the luminance and chrominance components using 8 bit integer numbers which span from 0 to 255. As mentioned above, these assumptions are only made to help facilitate the description of the method and apparatus and should not be viewed as restrictions to applications where these assumptions do not hold.

Figure 1:
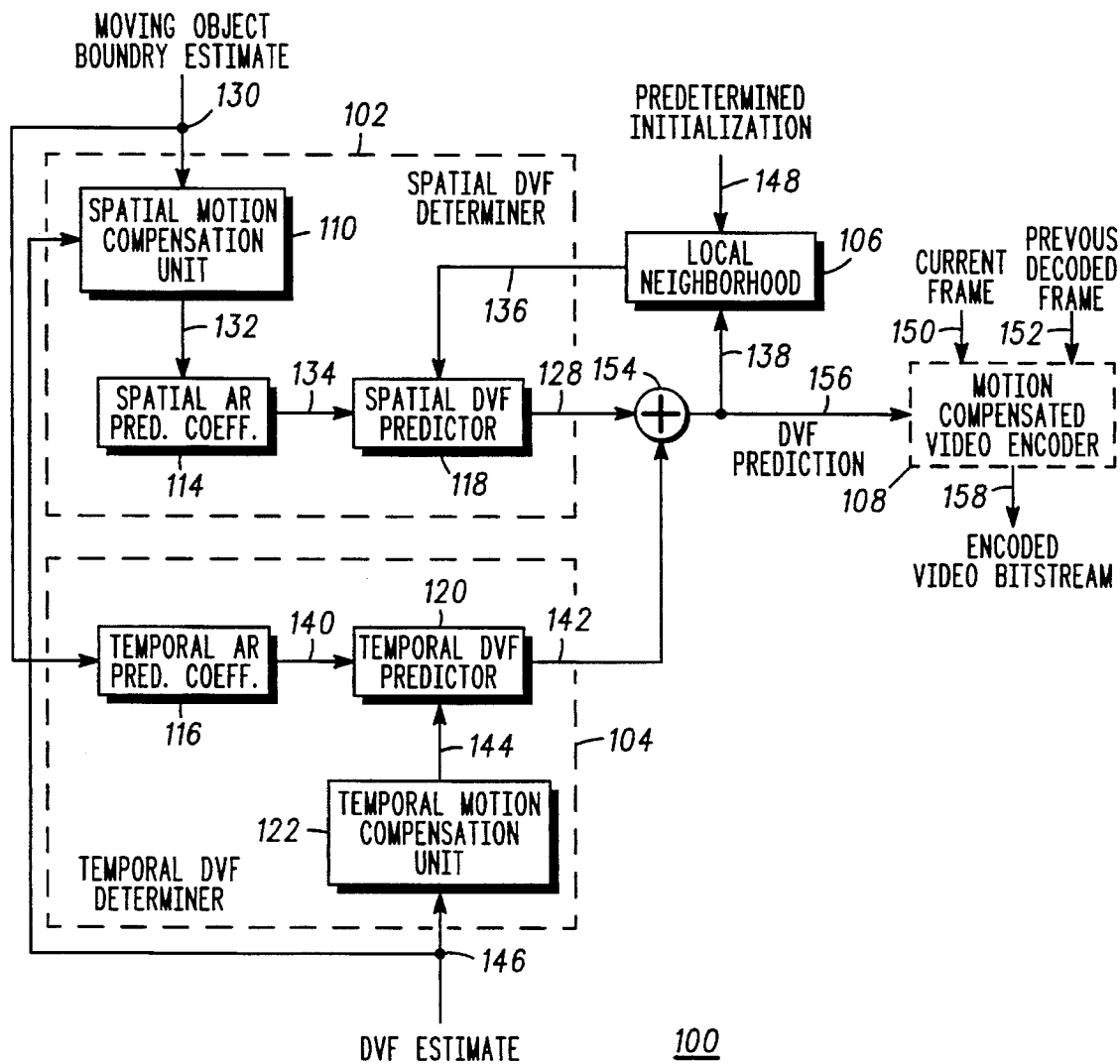
FIG. 1 is a diagram of a preferred embodiment of an apparatus for regenerating a dense motion vector field, DVF, for use in a motion compensated video encoder in accordance with the present invention.

FIG. 1, numeral 100, is a diagram of a preferred embodiment of an apparatus for regenerating a dense motion vector field, DVF, for use in a motion compensated video encoder in accordance with the present invention. The apparatus includes a spatial DVF determiner (102), a temporal DVF determiner (104), a causal local neighborhood of previously predicted dense motion vectors (106), and a motion compensated video encoder (108). Based on a moving object boundary estimate (130), a previous DVF (146), and a local neighborhood of predicted current dense motion vectors (136), the spatial. DVF determiner determines a prediction of the current DVF (128). Based on a moving object boundary estimate (130), and a previous DVF (146), the temporal DVF determiner determines a prediction of the current DVF (128). The spatial prediction (128) and temporal predictions (142) are combined (154) resulting in the final DVF prediction (156). This final DVF prediction (156) along with a current intensity frame (150) and a previous intensity frame (152), are inputs to a motion compensated video encoder (108). Based on the final DVF prediction (156), current intensity frame (150), and previous intensity frame (152), the motion compensated video encoder (108) reduces the amount of information required by the decoder to generate the present intensity frame (150).

The spatial DVF determiner (102) is comprised of a spatial motion compensation unit (110), a look-up table which contains spatial autoregressive, AR, prediction coefficients (114), and a spatial DVF predictor (118). The spatial DVF determiner (102) may be implemented using either an Application Specific Integrated Circuit, ASIC, gate array, or a Digital Signal Processor, DSP.

Utilizing a moving object boundary estimate (130) and DVF estimate (146) from the previous set of adjacent intensity frames, the spatial motion compensation unit (110) determines a prediction of the current moving object boundary (132). The following expression is used to generate this prediction $$\tilde{I}_k(r+\hat{d}_{k-1}(r))=I_{k-1}(r), \quad (1)$$

where $\tilde{I}_k(r)$ represents the prediction of the current moving object boundary (132) and $\hat{d}_{k-1}(r)$ the dense motion vector at position $r=(i,j)^T$ in the previously estimated DVF (146). Based on the moving object boundary prediction (132), a subset of the predetermined AR prediction coefficients $a(m, n|\tilde{I}_k(r))$ (134) are chosen from the look-up table (114) for use in the spatial DVF predictor (118).

The predetermined set of causal AR prediction coefficients (114) are typically found empirically. Generally, a least squares estimation approach is used on either a prototype or previously estimated DVF. The spatial DVF predictor (118) determines a prediction of the DVF based on the subset of AR prediction coefficients (134) and a local neighborhood of predicted dense motion vectors (136). The prediction operation is described by the following equation $$\bar{\bar{d}}_k(i,j) = \sum_{m,n \in R} a(m,n|\tilde{I}_k(r)) \cdot \bar{d}_k(i-m,j-n), \quad (2)$$

where $\bar{\bar{d}}_k(i,j)$ (128) is the prediction of the motion occurring at pixel location $r=(i,j)$ in the current image frame based on a local neighborhood of predicted dense motion vectors $\bar{d}_k(i,j)$ (136) and the AR prediction coefficients $a(m, nl \tilde{I}_k(r))$ (134) where $\tilde{I}_k(r)$ represents the prediction of the current moving object boundary and m and n are integers. The local neighborhood (136), R, of predicted dense motion vectors result from the summation (154) of the spatial DVF prediction (128) with the temporal DVF prediction (142). The temporal DVF prediction (128) is discussed in detail below.

The local neighborhood, R, of predicted dense motion vectors is a memory device which stores the predicted dense motion vectors in the following pixel locations: the pixel in the column directly to the left (i,j−1), the pixel in the row above and the column to the left (i−1,j−1), the pixel in the row above (i−1,j), and the pixel in the row above and the column to the right (i−1,j+1). The local neighborhood, R, is stored in the local neighborhood memory device (106). It should be noted that the choice of R is made at the time of implementation and is dependent on the method used to navigate through the two dimensional data sets used to represent the image and dense motion information at a particular time instant. For this particular R, it is assumed that the data is accessed from left to right across each row, starting with the top row. Other methods for navigating through the image and dense motion data can also be used. This would require a slight modification to the local neighborhood R; however the operations would remain the same.

The temporal DVF determiner (104) is comprised of a temporal motion compensation unit (122), a look-up table which contains temporal autoregressive, AR, prediction coefficients (140), and a temporal DVF predictor (118). Utilizing a moving object boundary estimate (130) and DVF estimate (146) from the previous set of adjacent intensity frames, the temporal motion compensation unit (122) determines a prediction of the current DVF (144) based on the previous DVF (146). The temporal DVF determiner (104) can be implemented using either an Application Specific Integrated Circuit, ASIC, gate array, or a Digital Signal Processor, DSP.

Since the temporal sampling rate is generally high, 30 frames/sec in the U.S. and 25 frames/second in Europe, it is assumed that objects under motion will continue to move in a similar direction over several frames. Therefore, based on the DVF estimated from the previous set of adjacent intensity frames, a good representation of the current DVF is obtained from the DVF estimated from the previous set of adjacent intensity frames. The temporal motion compensation (122) unit provides this representation of the current DVF (144) by motion compensating the previous DVF (146) with itself. The operation performed by the temporal motion compensation unit (122) is characterized by the following equation $$\tilde{d}_{k-1}(r)=\hat{d}_{k-1}(r-\hat{d}_{k-1}(r)), \quad (3)$$

where as described above for the spatial DVF determiner, $\hat{d}_{k-1}(r)$ (146) is the dense motion vector at position $r=(i,j)^T$ in the previously estimated DVF and $\tilde{d}_{k-1}(r)$ is the motion compensated version of the previously estimated DVF.

Utilizing the motion compensated previously estimated DVF (144) and the previous moving object boundary estimate (130), the temporal DVF predictor (120) determines a temporal prediction of the current DVF (142). Based on the previous moving object boundary estimate $I_{k-1}(r)$ (130), a subset of predetermined temporal AR prediction coefficients $b(m,n|I_{k-1}(r))$ (134) are chosen from the look-up table (116) for use in the temporal DVF predictor (120).

Since the complete motion compensated previous DVF (144) is available for use by the temporal DVF predictor (120), the predetermined set of temporal AR prediction coefficients (116) no longer are restricted by the particular data accessing method used. The temporal AR prediction coefficients are also typically found empirically. Generally, a least squares estimation approach is used on either a prototype or previously estimated DVF. The temporal DVF predictor (118) determines a prediction of the DVF based on the subset of the temporal AR prediction coefficients (134) and the motion compensated previous DVF (144). The prediction operation is described by the following equation $$\bar{d}_k(i,j) = \sum_{m,n \in R} b(m,n\|l_{k-1}(r)) \cdot \hat{d}_{k-1}(i-m, j-n), \quad (4)$$

where $\bar{d}_k$ (r) (142) is the prediction of the motion occurring at pixel location r≡(i,j) in the current image frame based on a neighborhood, $\Re$, of motion compensated previous dense motion vectors $\hat{d}_{k-1}(i,j)$ (144) and the AR prediction coefficients $b(m,n\|l_{k-1}(r))$ (140).

As mentioned above, since $\hat{d}_{k-1}(i,j)$ (144) is completely known there is no restriction of which dense motion vectors can be included in the neighborhood $\Re$, as is the case with the spatial prediction local neighborhood (136). However, the larger the spatial distance between dense motion vectors the less likely they are to be correlated. Therefore, the neighborhood $\Re$, which is different from the local neighborhood R (136), is chosen to the closest spatial neighbors to $\hat{d}_{k-1}(i,j)$. The neighborhood, $\Re$, consists of the following pixel locations in motion compensated previous DVF (144), referenced to pixel (i,j): the pixel in the column directly to the left (i,j−1), the pixel in the row above (i−1,j), the pixel in the row below (i+1,j), and the pixel one column to the right (i,j+1).

The final prediction of the current DVF $\tilde{d}_k$ (156) is obtaining by summing (154) the spatial DVF prediction d+ee $_k$ with the temporal DVF prediction $\bar{d}_k$. The resulting final prediction of the current DVF $\tilde{d}_k$, (156) is used by the motion compensated video encoder (108) to remove the temporal redundancy present in a video sequence. Since the previous moving object boundary estimate (130) and previous DVF estimate (146) is available at the decoder, no transmission of motion information is required. Instead, the motion information is regenerated at the decoder. The summing (154) can be carried out using an adder or DSP.

Figure 2:
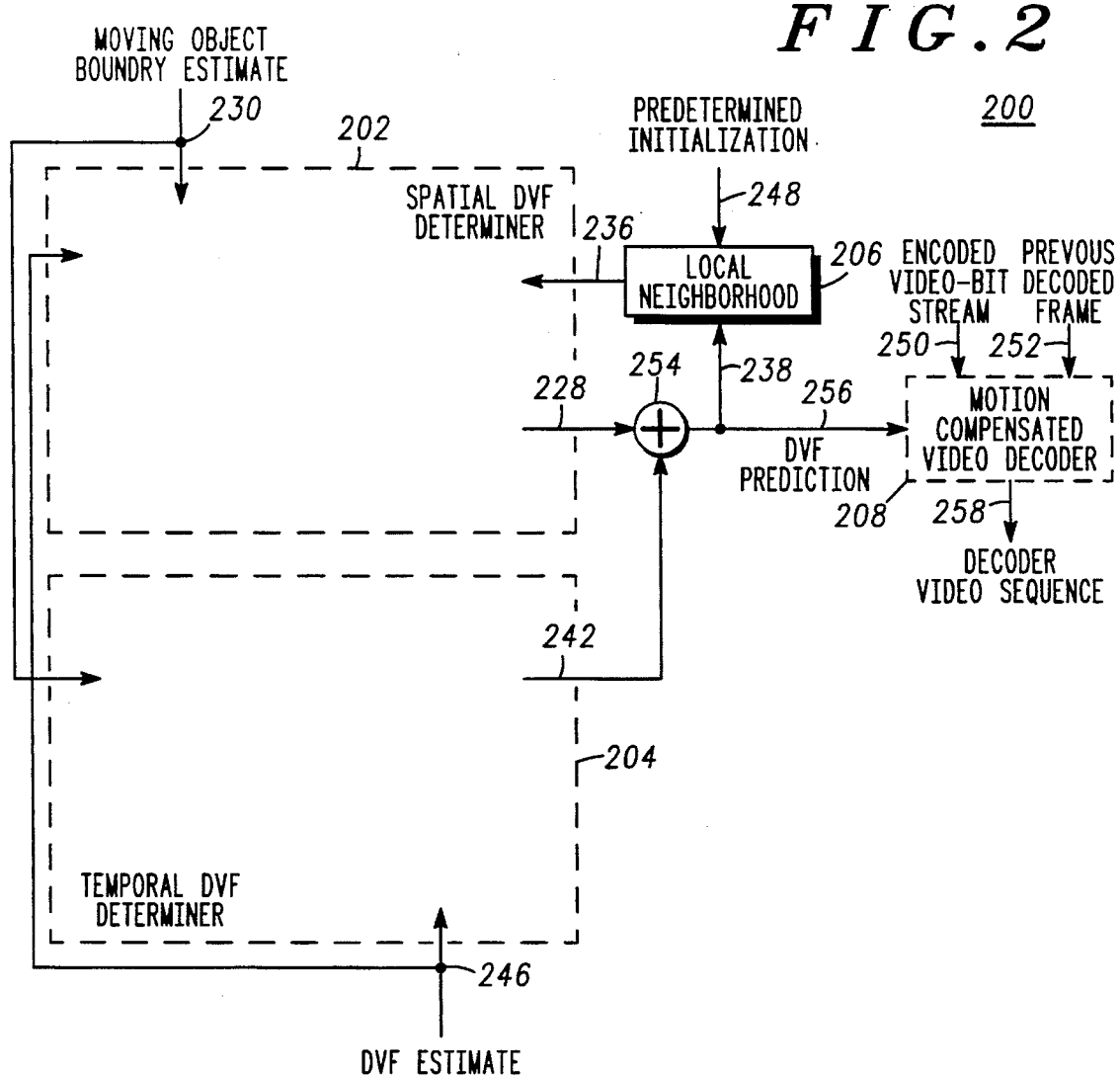
FIG. 2 is a diagram of a preferred embodiment of an apparatus for regenerating a dense motion vector field, DVF, for use in a motion compensated video decoder in accordance with the present invention.

FIG. 2, numeral 200, is a diagram of a preferred embodiment of a apparatus for regenerating a dense motion vector field, DVF, for use in a motion compensated video decoder in accordance with the present invention. The apparatus includes a spatial DVF determiner (202), a temporal DVF determiner (204), a causal local neighborhood of previously predicted dense motion vectors (206), and a motion compensated video encoder (208). Based on a moving object boundary estimate (230), a previous DVF (246), and a local neighborhood of predicted current dense motion vectors (236), the spatial DVF determiner determines a prediction of the current DVF (228). Based on a moving object boundary estimate (230), and a previous DVF (246), the temporal DVF determiner determines a prediction of the current DVF (228). The spatial prediction (228) and temporal predictions (242) are combined (254) resulting in the final DVF prediction (256). This final DVF prediction (256) is a regenerated version of a final DVF prediction (156) generated in a corresponding video encoder (100). This regenerated DVF (256) along with a previously decoded intensity frame (252) and encoded new information (250), are inputs to a motion compensated video decoder (208). Based on these inputs, the motion compensated video decoder decodes the video sequence which was compressed by the corresponding motion compensated video encoder (108).

Figure 3:
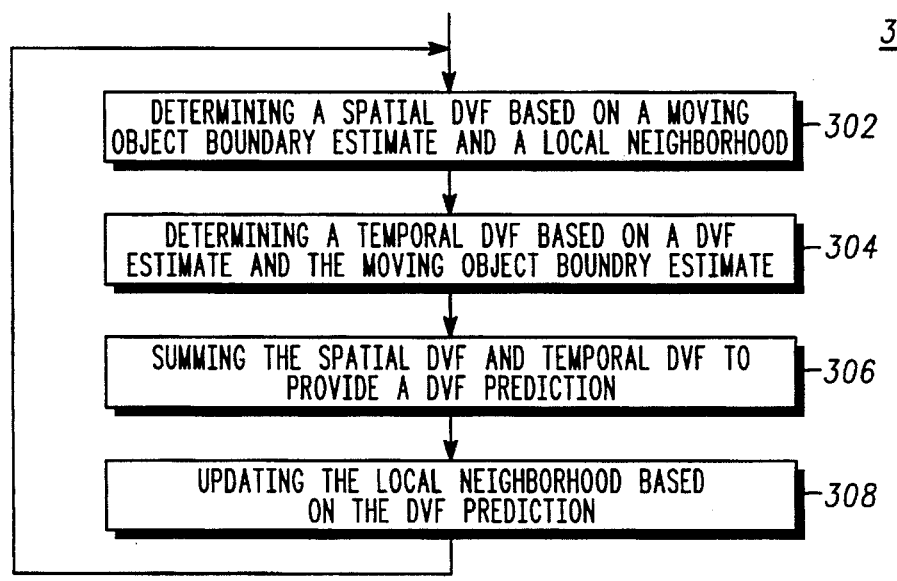
FIG. 3 is a flow diagram of the steps of a method for regenerating a dense motion vector field, DVF, in accordance with the present invention.

FIG. 3, numeral 300, is a flow diagram of the steps of a method for regenerating a dense motion vector field, DVF, in accordance with the present invention. The first step is to determine a spatial DVF based on a moving object boundary estimate and a local neighborhood (302). This step comprises motion compensating a previous moving object boundary estimate to provide a prediction of the current moving object boundary estimate, accessing a set of spatial autoregressive, AR, prediction coefficients, and predicting the spatial DVF by utilizing the spatial AR prediction coefficients and a local neighborhood of final current DVF predictions. At anytime, the previous DVF is motion compensated by itself. The next step is determining a temporal DVF based on a DVF estimate and the moving object boundary estimate (304). This step comprises accessing a set of temporal AR prediction coefficients, motion compensating a displacement vector field estimate, and predicting the current DVF by utilizing the temporal AR prediction coefficients and the motion compensated previous DVF. After both the spatial and temporal DVF prediction are available, the final prediction of the current DVF is generated by summing these two predictions together (306). The local spatial neighborhood is then updated (308).

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A method for regenerating a dense motion vector field, comprising:

determining, using a spatial DVF determiner, a spatial DVF based on a moving object boundary estimate and a local neighborhood of previous DVF predictions;

determining, using a temporal DVF determiner, a temporal DVF based on a DVF estimate and the moving object boundary estimate;

summing, using a summer, the spatial DVF and temporal DVF to provide a DVF prediction; and updating the local neighborhood of previous DVF predictions based on the DVF prediction.

2. The method of claim 1, wherein determining a spatial DVF comprises:

motion compensating, using a motion compensator, a moving object boundary estimate;

using a look-up table in a memory unit to provide a set of spatial autoregressive prediction coefficients based on a motion compensated moving object boundary estimate; and predicting, using a spatial DVF predictor, a spatial DVF based on the set of spatial autoregressive prediction coefficients and a local neighborhood.

3. The method of claim 1, wherein determining a temporal DVF comprises:

using a look-up table in a memory unit to provide a set of temporal autoregressive prediction coefficients based on the moving object boundary estimate;

motion compensating, using a motion compensator, a dense motion vector field, DVF, estimate;

predicting, using a temporal DVF predictor, a temporal DVF based on the set of temporal autoregressive prediction coefficients and a motion compensated DVF estimate;

summing, using a summer, the spatial DVF and temporal DVF to provide a DVF prediction; and updating the local neighborhood of previous DVF predictions based on the DVF prediction.

4. The method of claim 1, further comprising encoding a current frame based on the DVF prediction and a previous frame estimate.

5. The method of claim 1, further comprising decoding an encoded current frame based on the DVF prediction and a previous frame estimate.

6. The method of claim 1, wherein predicting the spatial DVF comprises:
multiplying each spatial autoregressive prediction coefficient by a corresponding element of the local neighborhood to provide a plurality of spatial products; and summing the spatial products.

7. The method of claim 1, wherein predicting the temporal DVF comprises:
multiplying each temporal autoregressive prediction coefficient by a corresponding motion compensated DVF estimate to provide a plurality of temporal products; and summing the temporal products.

8. The method of claim 1, wherein the local neighborhood is initialized to contain all zeros.

9. The method of claim 1 wherein the steps of the method are embodied in a tangible medium of/for a computer.

10. The method of claim 9 wherein the tangible medium is a computer diskette.

11. The method of claim 9 wherein the tangible medium is a memory unit of the computer.

12. The method of claim 1 wherein the steps of the method are embodied in a tangible medium of/for a Digital Signal Processor, DSP.

13. The method of claim 1 wherein the steps of the method are embodied in a tangible medium of/for an Application Specific Integrated Circuit, ASIC.

14. The method of claim 1 wherein the steps of the method are embodied in a tangible medium of/for a gate array.

15. The method of claim 1 wherein the steps of the method are in computer software embodied in a tangible medium.

16. An apparatus for regenerating a dense motion vector field, comprising:
a local neighborhood, in a memory device, coupled to receive a predetermined initialization, for storing DVF predictions;
a spatial DVF determiner, coupled to receive the DVF predictions, a moving object boundary estimate, and a DVF estimate, to provide a spatial DVF;
a temporal DVF determiner, coupled to receive the moving object boundary estimate and a DVF estimate, to provide a temporal DVF; and
a summer, operably coupled to the spatial DVF determiner and the temporal DVF determiner, for summing the spatial DVF and temporal DVF to provide a DVF prediction, the local neighborhood is updated based on the DVF prediction.

17. The apparatus of claim 16 wherein the spatial DVF determiner further comprises:
a spatial motion compensating unit, coupled to receive a moving object boundary estimate, for providing a motion compensated moving object boundary estimate;
a table of spatial autoregressive prediction coefficients, coupled to receive the motion compensated moving object boundary estimate, for providing a set of spatial autoregressive prediction coefficients based on the motion compensated moving object boundary estimate; and
a spatial DVF predictor, operably coupled to the local neighborhood and the table of spatial autoregressive prediction coefficients, for summing the products of spatial autoregressive prediction coefficients and elements of the local neighborhood to provide a spatial DVF.

18. The apparatus of claim 16 wherein the temporal DVF determiner further comprises:
a table of temporal autoregressive prediction coefficients, coupled to receive a motion compensated moving object boundary estimate, for providing a set of temporal autoregressive prediction coefficients based on the motion compensated moving object boundary estimate;
a temporal motion compensation unit, coupled to receive a DVF estimate, for providing a motion compensated DVF estimate; and
a temporal DVF predictor, operably coupled to the table of temporal autoregressive prediction coefficients and the temporal motion compensation unit, for summing the products of temporal autoregressive prediction coefficients and motion compensated DVF estimates to provide a temporal DVF.

19. The apparatus of claim 16 further comprising a motion compensated video encoder, operably coupled to the summer and to receive a current frame and a previous frame estimate, for encoding the current frame based on the DVF prediction and the previous frame estimate.

20. The apparatus of claim 16 further comprising a motion compensated video decoder, operably coupled to the summer and to receive an encoded frame and a previous frame estimate, for decoding the encoded frame based on the DVF prediction and a previous frame estimate.

21. The apparatus of claim 16 wherein the apparatus is embodied in a tangible medium of/for a computer.

22. The apparatus of claim 21 wherein the tangible medium is a computer diskette.

23. The apparatus of claim 21 wherein the tangible medium is a memory unit of the computer.

24. The apparatus of claim 16 wherein the apparatus is embodied in a Digital Signal Processor, DSP.

25. The apparatus of claim 16 wherein the apparatus is embodied in an Application Specific Integrated Circuit, ASIC.

26. The apparatus of claim 16 wherein the apparatus is embodied in a gate array.

\* \* \* \* \*

UNITED STATES PATENT AND TRADEMARK OFFICE
CERTIFICATE OF CORRECTION

PATENT NO.   : 5,574,663
DATED        : November 12, 1996
INVENTOR(S)  : Taner Ozcelik, James Brailean, and Aggelos K. Katsaggelos It is certified that error appears in the above-indentified patent and that said Letters Patent is hereby corrected as shown below:

Title page, item [73], should read

--Assignee:  Motorola, Inc., Schaumburg, IL and Northwestern University, Evanston, IL --

Signed and Sealed this

Thirtieth Day of June, 1998

Attest:

BRUCE LEHMAN

Attesting Officer

Commissioner of Patents and Trademarks